Nov. 30, 1937. E. F. SCHWANDER 2,100,673
DEVICE FOR THE COMBINED CONTROL OF THE ADMISSION OF AIR AND
OF FUEL IN AUTOMATIC HEAVY OIL FURNACES
Filed Feb. 19, 1936
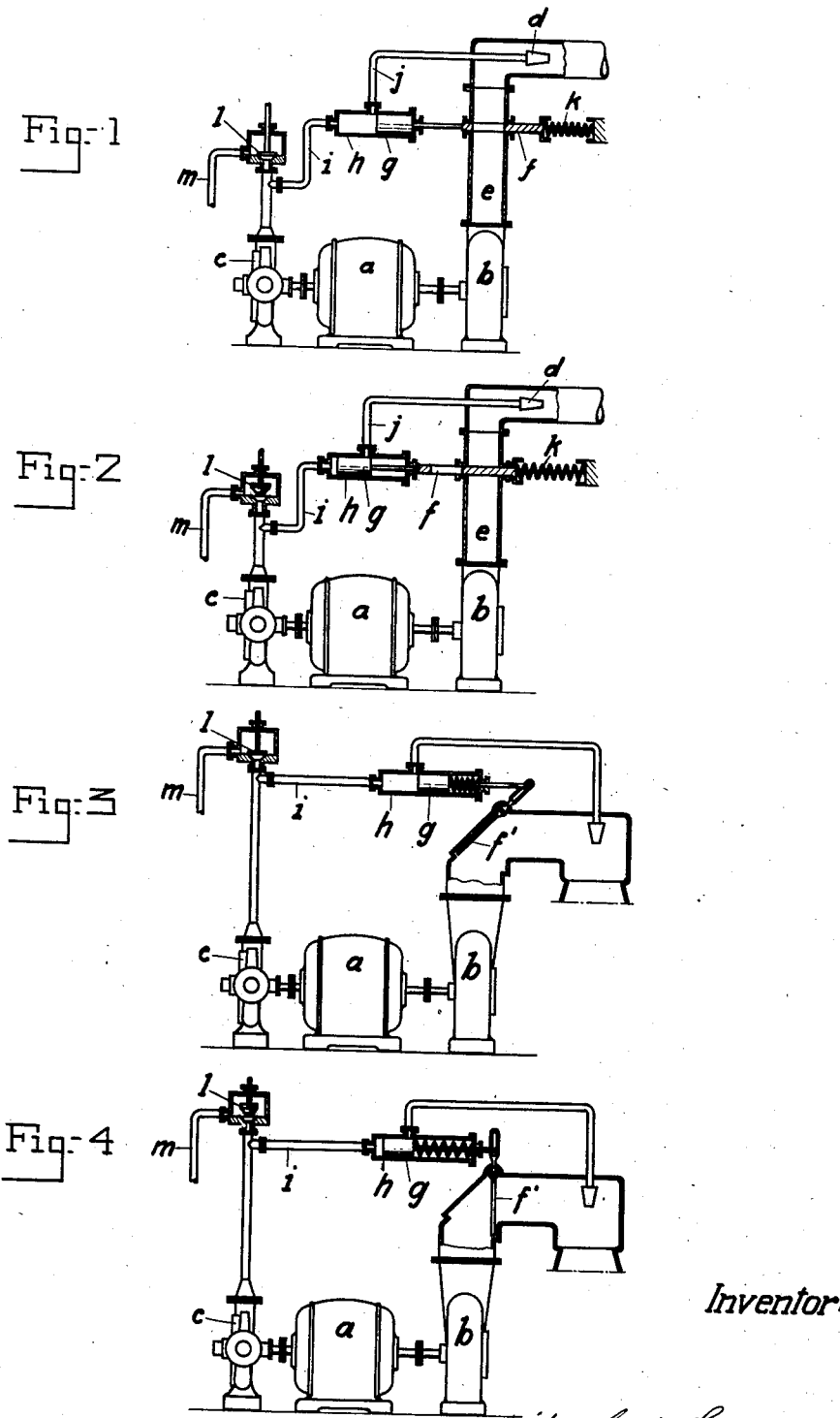
Inventor:

Patented Nov. 30, 1937

2,100,673

UNITED STATES PATENT OFFICE 2,100,673

DEVICE FOR THE COMBINED CONTROL OF THE ADMISSION OF AIR AND OF FUEL IN AUTOMATIC HEAVY-OIL FURNACES

Erwin Frédéric Schwander, Reichshoffen, France, assignor to Societe d'Etudes des Vehicules "Sev", Reichshoffen, France, a society of France Application February 19, 1936, Serial No. 64,798
In France March 20, 1935

1 Claim.  (Cl. 158—42.1)

The present invention relates to a device for the combined control of the admission of air and of fuel into automatic heavy-oil furnaces.

It is known that automatic heavy-oil furnaces are arranged so that the oil is, as far as possible, atomized under pressure and they are composed of the following principal parts: the motor, the blowing device, the oil pump operated by the motor, the burner and the regulator.

The regulator generally works in such a way that on the attainment of certain limiting temperatures in the heated apparatus, the motor and with it the combustion in the furnace are stopped; it can, moreover, also serve to influence the rotation speed of the motor.

On stoppage of the combustion in the furnace it is impossible, by reason of the inertia of the masses returning to the state of repose, to prevent the fuel and air being supplied to the furnace for a certain period and by this fact the combustion continues for the whole of this period. This "subsequent" heating is of no importance in the case of apparatus which have a high capacity for heat storing. If, however, these apparatus have no such power, the "subsequent" heating may cause serious disturbances. For example, in the case of steam generators with rapid vaporizing tubes having a very small water capacity, the regulation of the boiler may difficultly be effected, and this, particularly in the the case of generators built specially for the operation of vehicles as in this field of application the motor and the blower may have, for reaching a smaller weight, a very high rotation speed.

In order to avoid these difficulties, the following solutions have already been proposed: either to stop simultaneously the motor and the admission of fuel to the burner or to stop simultaneously the motor and the admission of fuel and air to the burner. In the first case there is indeed a reduction of the subsequent heating period but cold air is blown in for a certain time through the generator, and this leads to a wastage of heat and may cause serious damage, particularly if the tubes are formed of steel alloys. In the second case a defect in the element which cuts off the supply of fuel or of air can produce serious disturbances.

The method of combined control of the admission of air and of fuel which forms the object of the present invention fulfils the following requirements:

1. The fuel only reaches the burner if the air-passage is open.

2. When the furnace is put into operation, firstly the air only is supplied to the burner and then the fuel is subsequently supplied.

3. Stopping the furnace, firstly the fuel and then the air is cut off.

According to the invention, the supply of oil under pressure passes through a distribution device, the distributor member of which is loaded with a spring or a counterweight and acts at the same time on the distribution of oil and of air, so that the latter is always opened before and closed after the former. The arrival of oil to the distribution device may also be controlled by the regulator of the heating apparatus in such a way that first the oil arrival, and subsequently the air admission is cut off when a predetermined temperature limit value is reached in the heated apparatus.

The attached drawing shows by way of example and diagrammatically two embodiments for carrying out the method described, Figs. 1 and 3 showing the embodiments in operation and Figs. 2 and 4 in repose.

In these figures, $a$ designates the motor, $b$ the blower, $c$ the fuel pump and $d$ a burner. The pipe $e$ connecting the blower $b$ to the burner $d$ may be closed by a slider $f$ (Figs. 1 and 2) or by a valve $f^1$ (Figs. 3 and 4) coupled to a piston $g$ which slides in a cylinder $h$. At the opposite end of the cylinder there opens a pipe $i$ extending from the fuel pump $c$. Another pipe $j$ connects the cylinder $h$ to the burner $d$. This pipe $j$ is so positioned that it is uncovered when the piston $g$ is at the end of its stroke, as shown on Figs. 1 and 3, and consequently the air admission slide $f$ or the like, is completely open. When the motor is put in operation the pressure of the oil supplied by the fuel pump $c$ displaces the piston $g$ to the end of the stroke against the pressure of a spring $k$ acting as a counterweight. It will be noted that in the course of its movement the piston $g$ opens the air admission slide $f$ and it is only afterward, or even at the end of the stroke of the piston $g$ that the fuel admission pipe $j$ leading to the burner $d$ is uncovered. There is thus necessarily obtained in one direction of movement of the piston, the previous opening of the air admission, and afterward the fuel supply to the burner. In the other direction of movement, the closure of the fuel passage is followed by the closure of air passage.

The regulator spring K, or a similar device (counter-weight etc.) may be, in this case, previously regulated in order to obtain a movement of the piston $g$, (in starting the furnace) only when the fuel supplied from the pump c has reached the minimal pressure necessary for a perfect atomization in the burner. When the oil-pressure ceases for any reason during operation of the burner, as the result of damage to the pump, for example, it is seen that the air supply will be stopped.

In the pipe $i$ of the fuel feed pump may be connected as a branch a valve $l$ controlled in any suitable way, for example mechanically, hydraulically, pneumatically, or the like, by the regulator (not shown) of the generating apparatus. A branch pipe $m$ extends from the body of this valve toward a collecting tank back to the feeding pipe of the oil pump. As long as the regulator keeps the valve $l$ closed, the fuel pump ensures the oil supply to the burner. If, on the contrary, the regulator opens the valve, the pump feeds into the collecting tank or back to the feeding pipe of the oil pump and the pressure in the cylinder $h$ falls while the piston $g$ is pushed by the spring $k$ and the pipes $j$ and $e$ are closed successively.

In the device arranged in this way it is not necessary to stop the motor when the combustion is stopped. It is only necessary to prevent flow of air from the blower which turns idly.

I claim:

In a device for the combined control of air and of fuel in automatic heavy-oil furnaces comprising a burner, a fuel pump, a blower, a motor for simultaneously driving the blower and the fuel pump, conduits connecting the blower and the fuel pump to the burner, a regulating member for controlling the flow of air in said air conduit and a single means for controlling the flow of fuel in said fuel conduit and for controlling said regulating member comprising: a cylinder and a piston therein, said cylinder being inserted in said fuel conduit in such a manner that the portion of the fuel conduit leading from the pump is in communication with the cylinder adjacent one end of the piston stroke and the portion of the fuel conduit leading to the burner is in communication with the first conduit portion only when the piston is at the other end of its stroke, means biasing said piston toward the first mentioned end and means connecting the piston to said regulating member in such a manner that the regulating member is in full open position in the air conduit when the piston is at said other end of its stroke.

ERWIN FRÉDÉRIC SCHWANDER.